US012656511B2

(12) United States Patent
Tarnas

(10) Patent No.: US 12,656,511 B2
(45) Date of Patent: Jun. 16, 2026

(54) MODULAR NEUTRON SPECTROMETER

(71) Applicant: Blue Origin Manufacturing, LLC, Huntsville, AL (US)

(72) Inventor: Jesse Dylan Tarnas, Los Angeles, CA (US)

(73) Assignee: Blue Origin Manufacturing, LLC, Hunstville, AL (US)

( * ) Notice: Subject to any disclaimer, the term of this patent is extended or adjusted under 35 U.S.C. 154(b) by 214 days.

(21) Appl. No.: 18/675,573

(22) Filed: May 28, 2024

(65) Prior Publication Data

US 2025/0370149 A1      Dec. 4, 2025

(51) Int. Cl.
    *G01T 3/00*      (2006.01)
(52) U.S. Cl.
    CPC .................................... *G01T 3/001* (2013.01)
(58) Field of Classification Search
    None
    See application file for complete search history.

(56) References Cited

U.S. PATENT DOCUMENTS 4,272,680 A * 6/1981 Cotic ....................... H01J 47/02
                                                     250/385.1
7,119,340 B2 * 10/2006 Tsuchiya ............... G01T 1/2928
                                                     250/370.08

8,058,622 B2 * 11/2011 Yu ........................... G01T 1/208
                                                     250/369
8,519,343 B1 * 8/2013 Mihailescu ........... G01T 1/1647
                                                     250/367
10,451,747 B2 * 10/2019 Preston ................... G01T 1/023
2016/0266260 A1 * 9/2016 Preston ................... G01T 1/208

OTHER PUBLICATIONS

L.E. Heffern, et al. "Active neutron interrogation experiments and simulation verification using the Single-scintillator Neutron and Gamma-Ray spectrometer (SINGR) for geosciences," Nuclear Instrumentation and Measurements, vol. 1020, Sep. 16, 2021.
Q. Wang, Y. Yang, X. Tuo, C. Deng and H. Li, "Design of a Compact Neutron Spectrometer Using the CLYC Scintillator," 2017 IEEE Nuclear Science Symposium and Medical Imaging Conference (NSS/MIC), Atlanta, GA, USA, 2017, pp. 1-3.

* cited by examiner

*Primary Examiner* — Marcus H Taningco
(74) *Attorney, Agent, or Firm* — Summit Patents, PC

(57)      ABSTRACT

Methods and systems are presented for neutron spectroscopy that involves a modular neutron spectrometer that can be relatively easily customized for various measurement applications. In some embodiments, the modular neutron spectrometer may include a base and a plurality of ports, each configured for attaching a detector module. Different types and different numbers of detector modules may allow for such customization by changing total detector area, measurement collimation, and energy band sensitivity, just to name a few examples. Accordingly, features of a modular neutron spectrometer may be varied to accommodate a variety of experiments or measurement goals.

20 Claims, 3 Drawing Sheets

MODULAR NEUTRON SPECTROMETER

BACKGROUND

Lunar and planetary exploration often involves neutron spectroscopy, which is a technique that measures the energy and direction of neutrons emitted or scattered by the surface or subsurface of a planet or moon. Neutron spectroscopy can reveal information about the composition, structure, and dynamics of the materials that make up these bodies, such as the presence and distribution of water, ice, minerals, and organic molecules.

Neutron spectroscopy has been used to explore various lunar and planetary surfaces, such as the Moon, Mars, Mercury, and asteroids. For example, NASA's Lunar Prospector mission used a neutron spectrometer to detect the presence of hydrogen, which is a proxy for water, in the polar regions of the Moon.

Neutron spectroscopy works by using a neutron source, such as a pulsed neutron generator (PNG) or cosmic rays, that provides neutrons that interact with a target material. Depending on the energy and type of interaction, the neutrons can either bounce off the material (elastic scattering), lose some energy and excite the material (inelastic scattering), or be absorbed and cause a nuclear reaction (absorption). By measuring the energy and angle of the scattered or emitted neutrons, as well as the products of the nuclear reactions, such as gamma rays, protons, or alpha particles, one can infer the properties of the material, such as its atomic mass, density, temperature, magnetization, and chemical bonds. Different materials generally have different neutron scattering and absorption cross sections, which means they affect the neutron beam differently. By comparing the neutron spectra of different regions or depths of a planet or moon, one can map out the variations in the material composition and structure.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
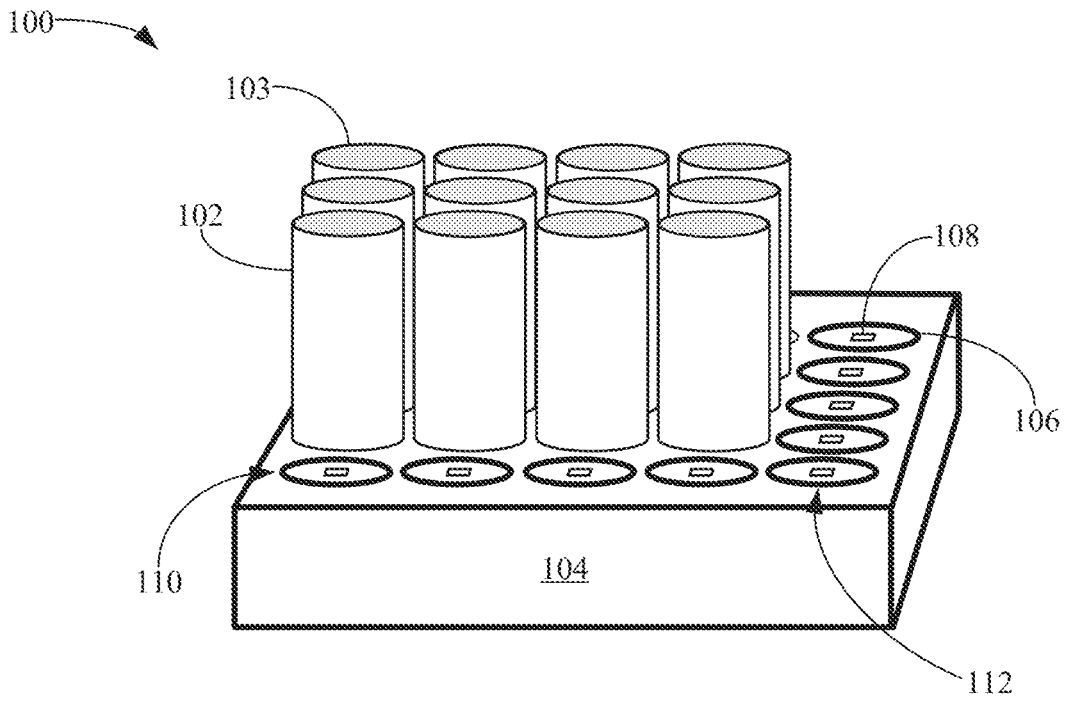
FIG. 1 is a schematic perspective view of a modular neutron spectrometer, according to some embodiments.

This disclosure describes, among other things, systems and methods for neutron spectroscopy that involve a modular neutron spectrometer that can be relatively easily customized for various measurement applications. In some embodiments, the modular neutron spectrometer may include a base and a plurality of ports, each configured for attaching a detector module. Attaching different types and different numbers of detector modules onto the base may allow for such customization by changing total detector area, measurement collimation, and energy band sensitivity, just to name a few examples. Accordingly, features of a modular neutron spectrometer may be varied to accommodate a variety of experiments or measurement goals. For example, if a higher rate of neutron detection is needed for a particular type of measurement, such as detecting the presence of water in the lunar surface, then the detection area of a modular neutron spectrometer may be increased by adding detector modules to the base.

Future use of lunar and other space resources will likely require prospecting for materials in the lunar or planetary environments. In planetary exploration, neutron spectrometers are commonly used, for example, to constrain the hydrogen abundance and depth distribution within the shallow planetary subsurface, while gamma-ray spectrometers are used to quantify the abundance of major and minor elements within rocks and soils. Passive techniques, which use the galactic cosmic ray proton flux to generate a source of high-energy neutrons within a surface material, have been used relatively frequently on planetary missions. In contrast, active neutron techniques, mostly used in lab settings, generally use a neutron source to bombard a sample, then subsequent neutrons and gamma rays emitted by the sample are measured.

In neutron spectroscopy systems, the focus is generally on individual components such as a scintillator crystal, a photo multiplier tube (or other type of photodetector), and data readout electronics and processing. For example, a photo multiplier tube (PMT) that is optically coupled to a scintillator crystal may be used to amplify very small photo signals produced by the scintillator crystal when the scintillator crystal interacts with neutrons (or gamma rays). Readout electronics may be connected to the PMT to process the signals from the PMT into a form that can be read and interpreted by an avionics system, for example. The avionics system may be a computer system (e.g., processor) that receives data produced by the readout electronics and processes the data further for analysis. In some embodiments, a modular neutron spectrometer may be configured so that each scintillator crystal and its accompanying electronics form a module. Each of these modules may be temporarily or provisionally installed to a port in a detector area base. Each installed module may operate independently of other installed modules, allowing for flexibility in the configuration of the modular neutron spectrometer. For example, a detector area base of a modular neutron spectrometer may have twenty ports to allow for up to twenty modules to be installed. Though each of these modules may detect (e.g., count) neutrons independently of one another, the modular neutron spectrometer may benefit from the total detector area of all the modules, resulting in a relatively sensitive or fast neutron spectrometer. On the other hand, if less modules are installed in the detector area base, perhaps for reducing instrument weight or cost, then the modular neutron spectrometer will be relatively less sensitive or slower. Apart from numbers of installed modules, types of modules (e.g., bandwidth sensitivity, filtering, detector area, etc.) may also be selected based on measurement goals, as explained below.

In particular embodiments, a modular neutron spectrometer that is operable with a variable number of neutron spectrometer detector modules may include a detector area base (hereinafter, "base") having an array of ports, which may be arranged in rows and columns. Each of the ports may include a mechanical interface that is configured to receive and physically support an installed neutron spectrometer detector module (hereinafter, "detector module). Each of the ports may also include an electronic interface that is configured to electronically connect to an installed detector module. The modular neutron spectrometer may operate even if some of the ports are not occupied with a detector module. Accordingly, the modular neutron spectrometer only operates in conjunction with installed detector modules. The modular neutron spectrometer may also include electronic circuitry that is connected to the electronic interfaces of each of the ports. The electronic circuitry may be configured to receive electronic signals separately from all of the detector modules that are installed in their respective ports. The electronic circuitry may be connected to an array of counters that count signals generated by each of the installed detector modules. A processor may also be connected to the electronic circuitry to receive electronic signals representative of counts produced by the installed detector modules. In some implementations, the processor may be part of an avionics system designed to measure and analyze neutron energy spectra in an aviation or space flight environment, such as a reconnaissance flight over the surface of Mars.

In some implementations, the base of the modular neutron spectrometer may include drive electronics configured to, via each of the ports, power and at least partially control the installed detector modules. For example, the drive electronics may include electronic circuitry to provide power to a photomultiplier of each of the installed detector modules.

In some implementations, each of the ports in the base of the modular neutron spectrometer may be configured to receive an electronic signal from an installed detector module that indicates that the detector module is installed at that port. In addition to the electronic signal indicating the presence (or lack thereof) of a detector module, the electronic signal may also indicate the type of the installed detector module. For example, the electronic signal may indicate a category of the type of the installed detector module according to its collimation and filtering. The electronic signal may be generated based on information stored on the detector module, as described below.

CLYC($Cs_2LiYCl_6$:Ce) is a dual-mode gamma-neutron scintillator material (e.g., scintillator crystal) that may be used as a replacement for both medium resolution gamma-ray detectors and Helium-3 proportional counter tubes for neutron detection. CLYC scintillator material allows for using pulse shape discrimination (PSD) for neutron detection and has better gamma-ray resolution as compared to sodium iodide (NaI) or caesium iodide (CsI). The vacuum of the lunar environment offers an advantage over terrestrial Earth environments for using CLYC scintillator material, which is hygroscopic. However, an individual CLYC-based detector may not be able to provide variable area coverage, such as a wide area aperture for higher resolution or a narrow area aperture for wider area coverage, in the same instrument. Thus, CLYC-based detectors are generally implemented as specific custom designs for each individual mission for which they are built. To counter such limitations, a modular neutron spectrometer, as described herein, may allow for implementation of multiple CLYC-based neutron detectors that are coupled to a single data and control module. This customizable configuration may provide desired measurement sensitivities for a variety of applications. For example, scintillation (based on CLYC or other material) may be added or subtracted (e.g., modified) from one design to another design in a modular way to adapt from one application to a different application requiring different scintillation. Accordingly, this modular design allows for space-rated CLYC crystal neutron spectrometers to be built for any application (e.g., satellite, flyby, surface mobility) without the need for a spectrometer redesign phase, for example.

FIG. 1 is a schematic perspective view of a modular neutron spectrometer 100, according to some embodiments. Modular neutron spectrometer 100 may include a plurality of installed detector modules 102 having an aperture 103 to receive neutrons and/or gamma rays. Each detector module may comprise a CLYC crystal or other scintillator material configured to produce scintillation light in response to incident neutrons or gamma rays. In particular, a CLYC ($Cs_2LiYCl_6$:Ce) crystal is sensitive to thermal neutrons, fast neutrons, and gamma rays and may be used to detect and measure the energy of the neutrons and gamma rays that impinge on the crystal. A photodetector (e.g., PMT) may be optically coupled to the CLYC crystal of each detector module to convert scintillation light produced by the CLYC crystal into electrical signals. A central electronics board, including a processor, may be configured to receive the electrical signals from each of the plurality of detector modules and subsequently perform pulse shape discrimination and pulse height analysis to determine the energy and type of the incident neutrons and gamma rays. The central electronics board need not comprise a single circuit board and various parts may be distributed apart from one another. Claimed subject matter is not limited in this respect.

Modular neutron spectrometer 100 may include a mechanical structure, such as a base 104, configured to interconnect the plurality of installed detector modules and to at least partially contain the central electronics board. Base 104 includes a plurality of ports 106 to which installed detector modules may connect. For example, port 106 may be configured to physical support detector module 102 via a connection such as a bayonet mount or other fastening mechanism between port 106 and detector module 102. Another type of connection may involve a male/female plug. Each port 106 may include an electronic interface 108 configured to electronically connect with an installed detector module 102.

Ports 106 may be arranged in various geometries and orientations to allow for desired customization of the modular neutron spectrometer for different applications. For example, ports 106 may be arranged in rows 110 and columns 112. In the particular example illustrated in FIG. 1, base 104 includes five rows and five columns. Thus, there are twenty-five ports 106 of which twelve are occupied with installed detector modules 102 and thirteen ports 106 are unoccupied. This number and positioning of detector modules on base 104 may be an optimal choice for a particular survey, for example, which calls for a total detector area provided by the twelve detector modules. On the other hand, another number and positioning of detector modules may be optimal for another survey. This variability of number and positioning of detector modules highlights an aspect of the usefulness of the customizability of the modular neutron spectrometer. Positioning of the detector modules on base 104 may be selected based on collimation details to be used for the survey, as described below.

Figure 2:
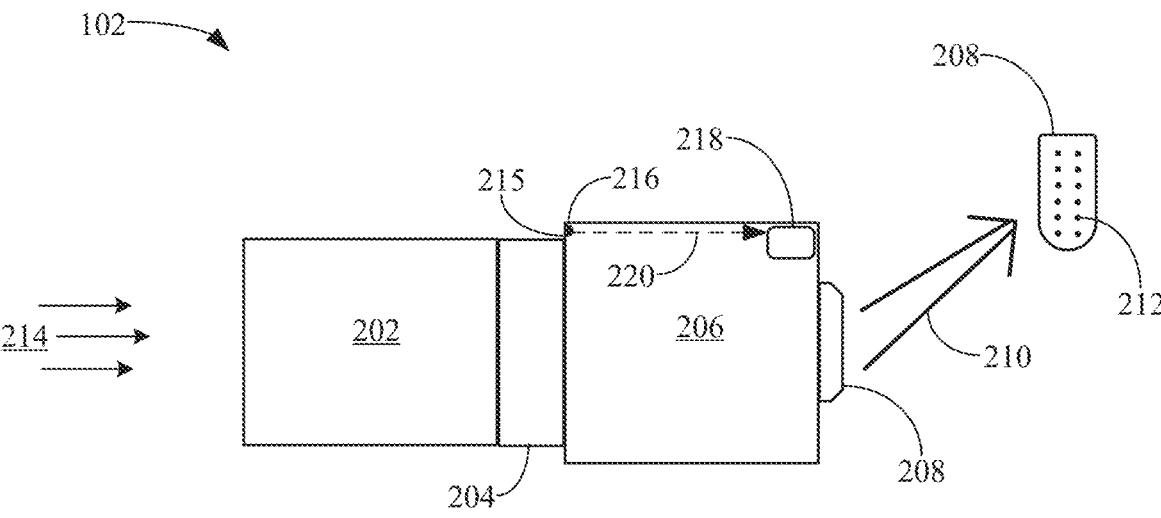
FIG. 2 is a schematic side view of a neutron spectrometer detector module, according to some embodiments.

FIG. 2 is a schematic side view of detector module 102, according to some embodiments. Detector module 102 may include a scintillator crystal 202, optical coupling 204, a PMT 206, and an electrical connector 208. Arrow 210 points to a close-up front view of electrical connector 208, which may include electrical contacts 212 (e.g., pins or pads, male or female), for example.

In some implementations, PMT 206 may be a base-integrated PMT that has a built-in high-voltage power supply and signal processing circuit. In this case, electrical connector 208 may include one or two wires for output and power supply for PMT 206. In other implementations, PMT 206 may be a base-separate PMT that has a separate electrical base that contains the high-voltage power supply and signal processing circuit. In this case, electrical connector 208 may include multiple wires for connecting PMT 206 to the electrical base and an external computer or processor.

Scintillator crystal 202 may be a single-crystal of $Cs_2YLiCl_6$:Ce, called a CLYC crystal, as mentioned above. CLYC crystals generally have a dominant $^6$Li(n, alpha)t reaction, allowing for the detection of incident neutrons 214. The signal generated by the alpha-particle and triton (t) produces a light pulse with a transient response different from that of gamma-ray reactions in CLYC. In some implementations, just to provide a particular example, scintillator crystal 202 may be a cylindrical CLYC crystal that is two inches diameter by two inches long (a two inch crystal). Though scintillator crystal 202 need not be a CLYC crystal, and claimed subject matter is not limited in this respect, a CLYC crystal provides a benefit of being capable of detecting both neutrons and gamma rays and is efficient at both small and large volumes for neutron detection. In some planetary science missions, just to provide a particular example, CLYC crystals that are larger than 2 inches may provide higher count rate statistics (decreasing the necessary integration time) and more efficient high-energy sensitivity to gamma rays. Accordingly, for these missions, modular neutron spectrometer 100 may be "fitted" with detector modules 102 having three inch scintillator crystals 202. Alternatively, modular neutron spectrometer 100 may be "fitted" with detector modules 102 having the smaller two inch scintillator crystals 202 of the example above, but with a greater number of such detector modules 102 installed in base 104. The greater number of modules may provide the desired total detector (crystal) area even though the area of each two-inch detector is smaller than the area of the three inch detector.

Interestingly, CLYC crystals may have a drawback, wherein radiation and thermal damage from general use over time may substantially degrade the detection efficiency of the CLYC crystals for both gamma ray and neutron detection. Modular neutron spectrometer 100, however, allows for relatively easy replacement of older degraded detector modules 102 with new detector modules 102. As an alternative, as older detector modules 102 degrade, additional detector modules 102 may be added to base 104 so as to maintain a desired measurement sensitivity and/or count rate statistics.

In some embodiments, detector module 102 may include a receiver surface 215 onto which an installed collimator may be placed, as explained in detail below. A corresponding collimator detector 216 may detect and identify the type of installed collimator, including identifying parameters of the collimator, such as its dimensions and filtering characteristics. Information regarding the type of the installed collimator may be provided to an attribute module 218, as indicated by arrow 220. Attribute module 218 may be configured to generate an electronic signal comprising information that describes the type of detector module 102. In some implementations, attribute module 218 may be a read only memory (ROM) that stores retrievable information about various characteristics or parameters about detector module 102. Such information may include type of scintillator crystal, crystal dimensions, and so on. In other implementations, attribute module 218 may be a read-write memory that stores information about various characteristics or parameters about detector module 102 and an installed collimator, as explained below. Such information may include type of scintillator crystal, crystal dimensions, collimator dimensions, collimator material, collimator filter, and so on. In both implementations, information retrieved from attribute module 218 may be provided to a processor in base 204 via electrical connector 208 and electronic interface 108, for example. In some cases, attribute module 218 may be a priori programmed with the above stored information during assembly or manufacture of detector module 102 and/or installation of a collimator onto the detector module.

Figure 3:
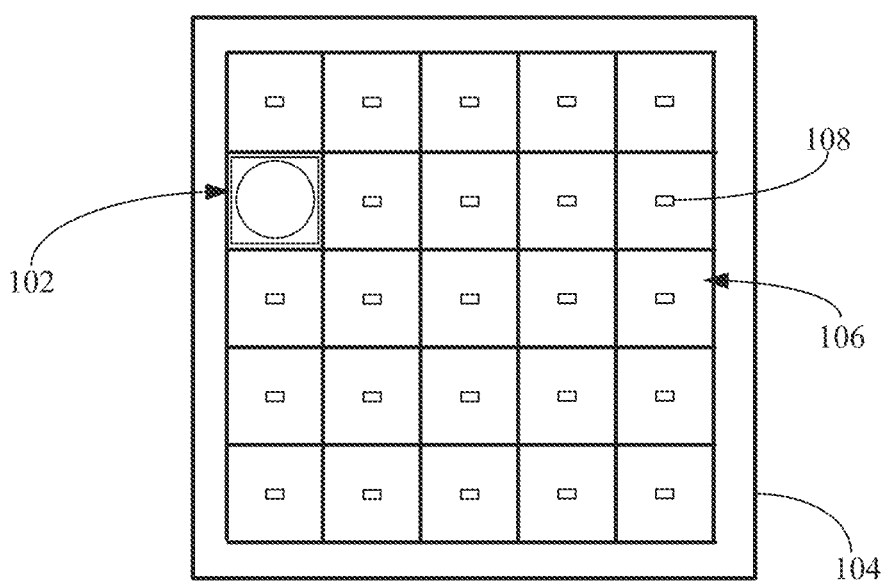
FIG. 3 is a schematic top view of a base for a modular neutron spectrometer, according to some embodiments.

FIG. 3 is a schematic top view of base 104 for modular neutron spectrometer 100 that includes one installed detector module 102, according to some embodiments. Base 104 includes a plurality of ports 106 to which detector modules 102 may connect. For example, port 106 may be configured to physical support detector module 102 via a connection such as a bayonet-type of mechanical interaction between port 106 and module 102. Another type of connection may involve a male/female plug (not illustrated). Each port 106 may include an electronic interface 108 (e.g., an electronic connector) configured to electronically connect with an installed detector module 102, as described above.

Though ports 106 are illustrated as being arranged in rows and columns, ports 106 may be arranged in various geometries and orientations to allow for desired customization of the modular neutron spectrometer for different applications. Also, base 104 includes five rows and five columns as illustrated. Claimed subject matter, however, is not limited to any particular number or arrangement of ports.

Figure 4:
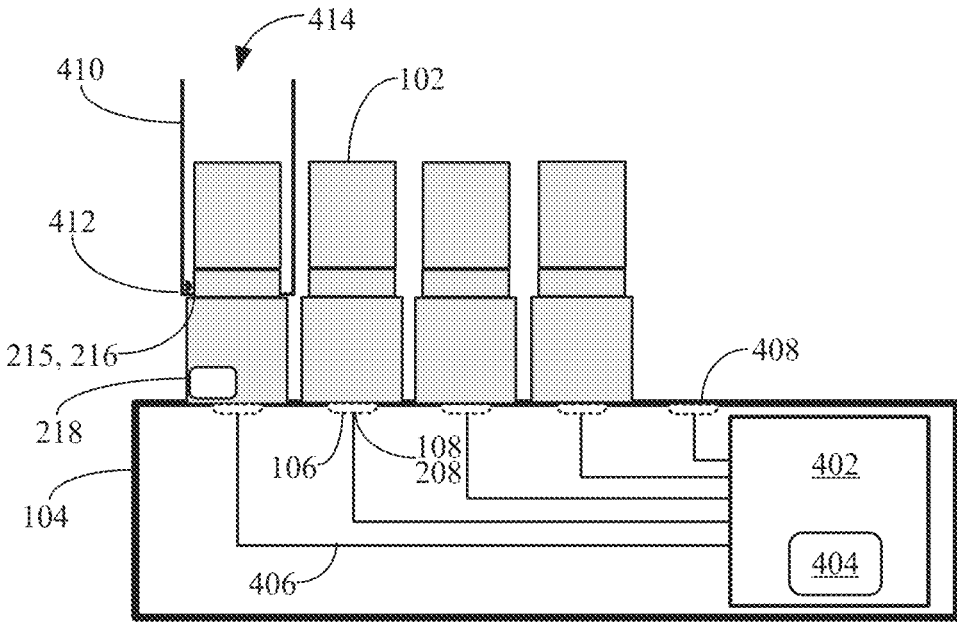
FIG. 4 is a schematic side view of a cross-section of a modular neutron spectrometer, according to some embodiments.

FIG. 4 is a schematic side view of a cross-section of modular neutron spectrometer 100, according to some embodiments. Modular neutron spectrometer 100 may include a plurality of detector modules 102, A central electronics board 402, including a processor 404, may be configured to receive electronic signals generated by the plurality of detector modules 102. Detector modules 102 may be installed in ports 106 in base 104. Central electronics board 402 may be at least partially located in base 104 and electronically interconnected to electronic interface 108 of each port 106 via multiconductor cables 406.

FIG. 4 illustrates that every port 106 need not include an installed detector module. For example, port 408 is absent a detector module.

As mentioned above, in some embodiments detector modules 102 may include a receiver surface 215 onto which an installed collimator 410 may be placed, as explained in detail below. A corresponding collimator detector 216 may detect and identify the type of installed collimator 410, including identifying parameters of the collimator, such as its dimensions and filtering characteristics. As described below, collimator 410 may include a ROM 412 that includes retrievable information about various characteristics or parameters of the collimator, such as its dimensions, size of aperture 414, wall material, and filter material (in the aperture), just to name a few examples. Collimator detector 216 may be configured to retrieve such information from ROM 412 upon or after collimator 410 is installed onto receiver surface 215 of detector module 102. As mentioned above, the information from ROM 412 may be provided to attribute module 218 in detector modules 102. In turn, the collimator information may be provided to processor 404 via electrical connector 208 and electronic interface 108 in port 106, for example.

Multiconductor cables 406 may comprise individual wires for data and power transfer. For example, some of the wires may carry power and ground to PMT 206 and other wires may carry detection signals produced by the PMT. Other wires may carry electronic signals representative of information about collimator 410 and detector modules 102. Such information may be provided onto some of the wires of multiconductor cables 406 from attribute module 218. Such information may also be provided from ROM 412 if a collimator 410 is installed onto receiver surface 214 of detector modules 102.

Figures 5, 6:
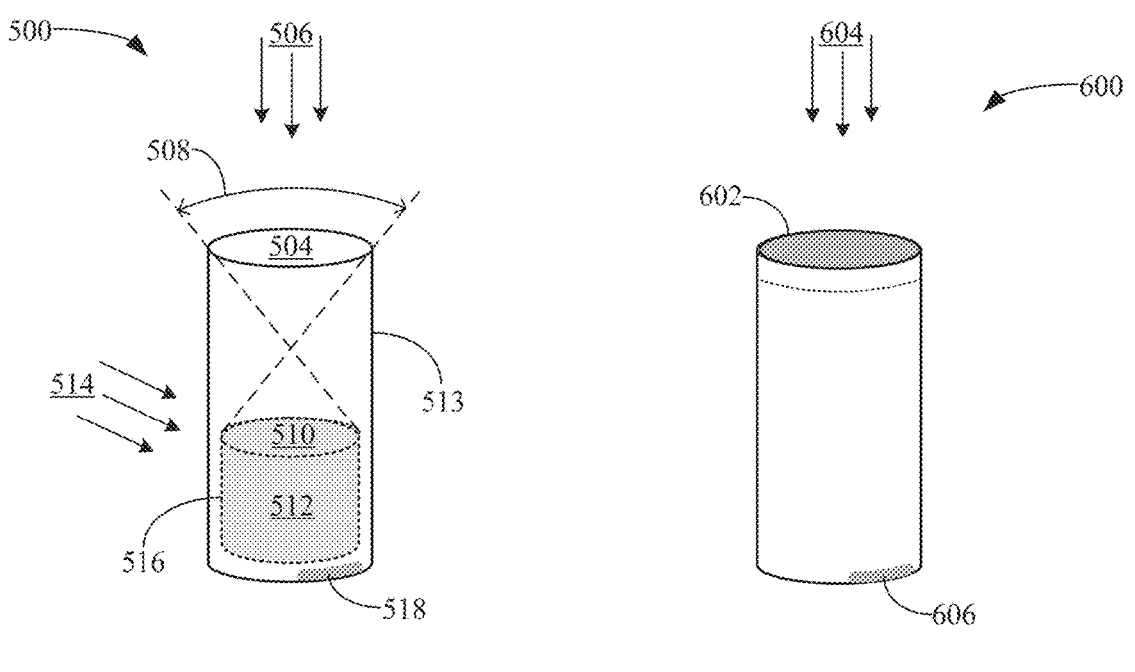
FIG. 5 is a schematic perspective view of a collimator for a neutron spectrometer detector module, according to some embodiments.
FIG. 6 is a schematic perspective view of a collimator and filter for a neutron spectrometer detector module, according to some embodiments.

FIG. 5 is a schematic perspective view of a collimator 500 for a detector module, according to some embodiments. For example, collimator 500 may be the same as or similar to collimator 410. Generally, a collimator may be used for controlling the detection of neutrons and gamma rays in neutron spectroscopy. Aperture 504 of collimator 500 may at least partially control incoming neutrons and gamma rays 506 by defining a solid angle 508 for which the incoming neutrons and gamma rays can impinge into a front surface 510 of a detector 512 of the detector module. Solid angle 508 may be based on aperture 504 and the position of front surface 510 (e.g., of a scintillator crystal) with respect to the position of the aperture. Wall(s) 513 may also control incoming neutrons and gamma rays 514 by blocking or filtering the neutrons and gamma rays that would otherwise impinge into side(s) 516 of detector 512. In some implementations, walls 513 may be made of a material that blocks gamma rays but allows neutrons (e.g., of a particular energy band) to pass to detector 512. For example, gadolinium foil may be used to at least partially cover wall(s) 513.

In some embodiments, collimator 500 may include a ROM 518, which may be the same as or similar to ROM 412, that stores information about the collimator. For example, such information may include aperture dimensions, collimator dimensions, collimator wall material (e.g., and thickness), and type of filter, if one is present, in the aperture. The information stored in ROM 518 may be provided to electronics (e.g., attribute module 218) in a detector module (e.g., 102) and/or electronics (e.g., central electronics 402) in a base of a modular neutron spectrometer, for example. ROM 518 may be used in conjunction with a collimator detector (e.g., 216) to allow the modular neutron spectrometer, via the detector module, to detect and identify the type of collimator installed thereon.

FIG. 6 is a schematic perspective view of a collimator 600 and filter 602 for a detector module, according to some embodiments. For example, collimator 600 may be the same as or similar to collimator 500 but with the addition of filter 602 that covers the aperture (e.g., 504) of the collimator. Generally, the purpose of filters in neutron spectroscopy is to transmit neutrons (and gamma rays) with selected energies, while removing unwanted ones from incident neutrons 604. This filtering may generally reduce the number of background and spurious neutrons. Filter 602 may comprise various types of materials or elements, such as bismuth, lead, cadmium, and boron, just to name a few examples. Neutron beams passed by filter 602 may be characterized by parameters such as a neutron flux, energy band(s), or a neutron-to-gamma count ratio, for example.

In some embodiments, collimator 600 may include a ROM 606, which may be the same as or similar to ROM 518, that stores information about the collimator and the filter, as described above.

Figures 7, 8:
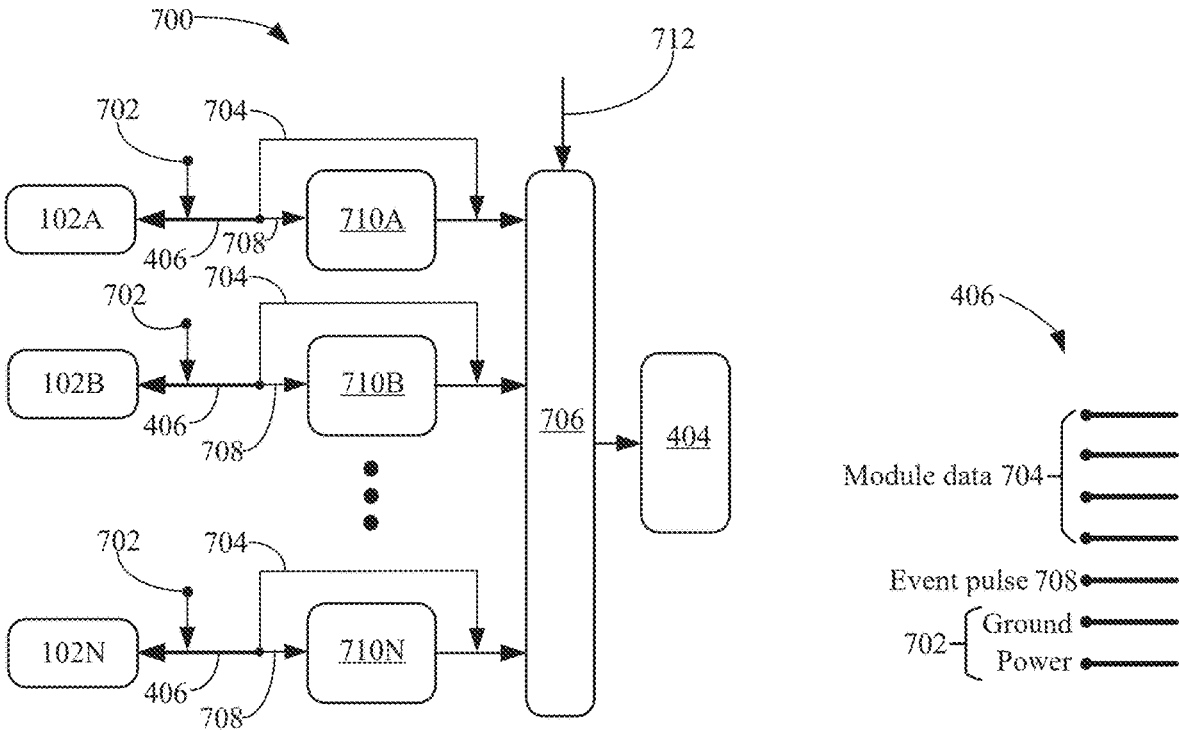
FIG. 7 is a schematic block diagram of an electronic circuit for counting and processing signal events of multiple neutron spectrometer detector modules installed in a modular neutron spectrometer, according to some embodiments.
FIG. 8 is a schematic diagram labelling conductors of a multiconductor cable that may be used to transfer electrical signals and power between a base of a modular neutron spectrometer and installed neutron spectrometer detector modules, according to some embodiments.

FIG. 7 is a schematic block diagram of an electronic circuit 700 for counting and processing signal events of multiple detector modules, such as 102, according to some embodiments. For example, each multiple detector module 102 may generate an electronic pulse representing an event, which is an interaction of a neutron with material of a detection crystal, such as a CLYC crystal. The number of events represents the number of detected neutrons. In some implementations, the magnitude (e.g., amplitude and/or pulse width) of the electronic pulse of an event may represent the energy of a neutron that caused the event. Counting events per unit time for neutrons in a particular energy range (which may be selected by filter 602, for instance) may provide information about amounts and types of chemical elements at or near a planetary surface, for example, by measuring the way neutrons are released from the surface, as explained above. Similarly, events from gamma ray detection may provide useful information by measuring how gamma rays interact with different surface materials. In particular examples, inelastic neutron scattering, as measured by a modular neutron spectrometer (e.g., 100) observes the change in the energy of a neutron as it scatters from a sample and can be used to probe a wide variety of different physical phenomena such as the motions of atoms (diffusional or hopping), the rotational modes of molecules, sound modes and molecular vibrations, recoil in quantum fluids, magnetic and quantum excitations or electronic transitions.

For a particular example, electronic circuit 700 is described herein as being central electronics board 402, but claimed subject matter is not limited to any particular electronics configuration. Detector modules 102 (102A-102N, representing N detector modules) installed in ports 106 of base 104 of modular neutron spectrometer 100 may provide data and power transfer via multiconductor cables 406, each comprising a number of individual wires. An implementation of a multiconductor cable 406 is illustrated in FIG. 8. For example, some of the wires of cable 406 may carry power and ground to detector module 102. The power and ground may be provided by a separate source 702. Other wires 704 may carry module data comprising various voltages or signals from attribute module 218 and/or ROM 412. These voltages or signals may be representative of information about detector modules 102 that are installed in ports 106 as well as information about collimators 410 that may be installed on any of the detector modules. In some implementations, wires 704 may carry a 4-bit digital signal that represents collimator and/or detector module information, as described above. When a multiplexer 706 passes the 4-bit digital signal to processor 404, the processor may use a lookup table to determine what information about the collimator and/or the detector module corresponds to the 4-bit digital signal.

One of the wires 708 of multiconductor cable 406 may provide event pulses generated by detector modules 102 to a counter 710 (710A-710N, representing N counters). The counters count and hold a final count of event pulses (counted over a span of time) until the final count is sampled at multiplexer 706 and reset to zero for a subsequent count cycle. The number of inputs at multiplexer 706 may correspond to the number N of detector modules 102. In some implementations, signals on wires 704 may also have respective inputs at multiplexer 706 so that signals from respective detector modules 102 may be cyclically sampled by multiplexer 706 along with sampling counts of the modules. Sampling by multiplexer 706 may be controlled by an address input 712, for example. In some implementations, based on module data, processor 404 may determine the number of installed detector modules 102. Based on that number, processor 404 may control address input 712 for sampling data at all the inputs of multiplexer 706 that correspond to installed detector modules 102, wherein inputs for unoccupied ports (e.g., 408), if any, may be ignored. Accordingly, processor 404 may maintain event counts for each installed detector module 102 (occupying a port) regardless of the number of installed modules versus the number of vacant ports.

In some implementations, processor 404 may include any type of computing device having one or more processing units operably connected to computer-readable media. The computer-readable media may include two types of computer-readable media, namely computer storage media and communication media. Computer storage media may include volatile and non-volatile machine-readable, removable, and non-removable media implemented in any method or technology for storage of information (in compressed or uncompressed form), such as computer (or other electronic device) readable instructions, data structures, program modules, or other data to perform processes or methods described herein. Communication media may embody computer-readable instructions, data structures, program modules, or other data in a modulated data signal, such as a carrier wave, or other transmission mechanism. Communication media may be used to transmit data measured by the modular neutron spectrometer to remote destinations, for example.

In some examples, computer-readable media may store instructions executable by processor 404. Computer-readable media may also store instructions executable by an external CPU-based processor, executable by a GPU, and/or executable by an accelerator, such as an FPGA-based accelerator, a DSP-based accelerator, or any internal or external accelerator, just to name a few examples. Executable instructions stored on computer-readable media may include, for example, an operating system and other modules, programs, or applications that may be loadable and executable by processor 404.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific embodiments or examples are presented by way of examples for purposes of illustration and description. They are not intended to be exhaustive of or to limit this disclosure to the precise forms described. Many modifications and variations are possible in view of the above teachings. The embodiments or examples are shown and described in order to best explain the principles of this disclosure and practical applications, to thereby enable others skilled in the art to best utilize this disclosure and various embodiments or examples with various modifications as are suited to the particular use contemplated. It is intended that the scope of this disclosure be defined by the following claims and their equivalents.

I claim:

1. A modular neutron spectrometer that is operable with a variable number of neutron spectrometer detector modules, the modular neutron spectrometer comprising:
   a base having an array of ports, wherein each of the ports includes i) a mechanical interface configured to receive and physically support an installed neutron spectrometer detector module and ii) an electronic interface configured to electronically connect to the installed neutron spectrometer detector module; and
   electronic circuitry connected to the electronic interfaces of each of the ports and configured to receive electronic signals from respective installed neutron spectrometer detector modules.

2. The modular neutron spectrometer of claim 1, wherein the electronic circuitry is further connected to an array of counters, each of the counters configured to count signals generated by the respective installed neutron spectrometer detector modules.

3. The modular neutron spectrometer of claim 1, further comprising a processor connected to the electronic circuitry and to receive electronic signals representative of counts of the respective installed neutron spectrometer detector modules.

4. The modular neutron spectrometer of claim 1, further comprising drive electronics configured to, via the array of ports, power and at least partially control the respective installed neutron spectrometer detector modules.

5. The modular neutron spectrometer of claim 4, wherein the drive electronics include electronic circuitry to provide power to a photomultiplier of respective installed neutron spectrometer detector modules.

6. The modular neutron spectrometer of claim 1, further comprising at least one installed neutron spectrometer detector module in the array of ports.

7. The modular neutron spectrometer of claim 6, wherein the at least one installed neutron spectrometer detector module includes an attribute module configured to generate an electronic signal comprising information about a type of the at least one installed neutron spectrometer detector module.

8. The modular neutron spectrometer of claim 7, wherein the information about the type of the at least one installed neutron spectrometer detector module comprises information about collimation and filtering of the at least one installed neutron spectrometer detector module.

9. The modular neutron spectrometer of claim 1, wherein the array of ports is configured in rows and columns of the ports.

10. A modular neutron spectrometer comprising:
    a base that includes an array of ports, each of the ports including an electronic interface;
    at least one installed neutron spectrometer detector module in a respective port of the array of ports, wherein the installed neutron spectrometer detector module includes a scintillator, a photomultiplier, and an electronic connector to connect to the electronic interface of the respective port; and
    electronic circuitry connected to the electronic interfaces of each of the ports and configured to receive electronic signals from the installed neutron spectrometer detector modules.

11. The modular neutron spectrometer of claim 10, wherein the electronic circuitry is further connected to an array of counters, each of the counters configured to count signals generated by each of the installed neutron spectrometer detector modules.

12. The modular neutron spectrometer of claim 10, further comprising a processor connected to the electronic circuitry and to receive electronic signals representative of counts of each of the installed neutron spectrometer detector modules.

13. The modular neutron spectrometer of claim 10, further comprising drive electronics configured to, via the array of ports, power and at least partially control the installed neutron spectrometer detector modules.

14. The modular neutron spectrometer of claim 13, wherein the drive electronics include electronic circuitry to provide power to the photomultiplier of each of the installed neutron spectrometer detector modules.

15. The modular neutron spectrometer of claim 10, wherein the at least one installed neutron spectrometer detector module further includes an attribute module configured to generate an electronic signal comprising information about a type of the at least one installed neutron spectrometer detector module.

16. The modular neutron spectrometer of claim 15, wherein the information about the type of the at least one installed neutron spectrometer detector module comprises information about collimation and filtering of the at least one installed neutron spectrometer detector module.

17. The modular neutron spectrometer of claim 15, wherein the attribute module is configured to provide the information about the type of the at least one installed neutron spectrometer detector module to a processor via the electronic interface.

18. The modular neutron spectrometer of claim 17, wherein the processor is configured to determine a total detector area of the at least one installed neutron spectrometer detector module based on the information about the type of the at least one installed neutron spectrometer detector module.

19. The modular neutron spectrometer of claim 10, wherein the at least one installed neutron spectrometer detector module further includes a collimator detector.

20. The modular neutron spectrometer of claim 10, further comprising at least one empty port comprising a port of the array of ports that is absent a neutron spectrometer detector module.

* * * * *